Patented Aug. 14, 1945

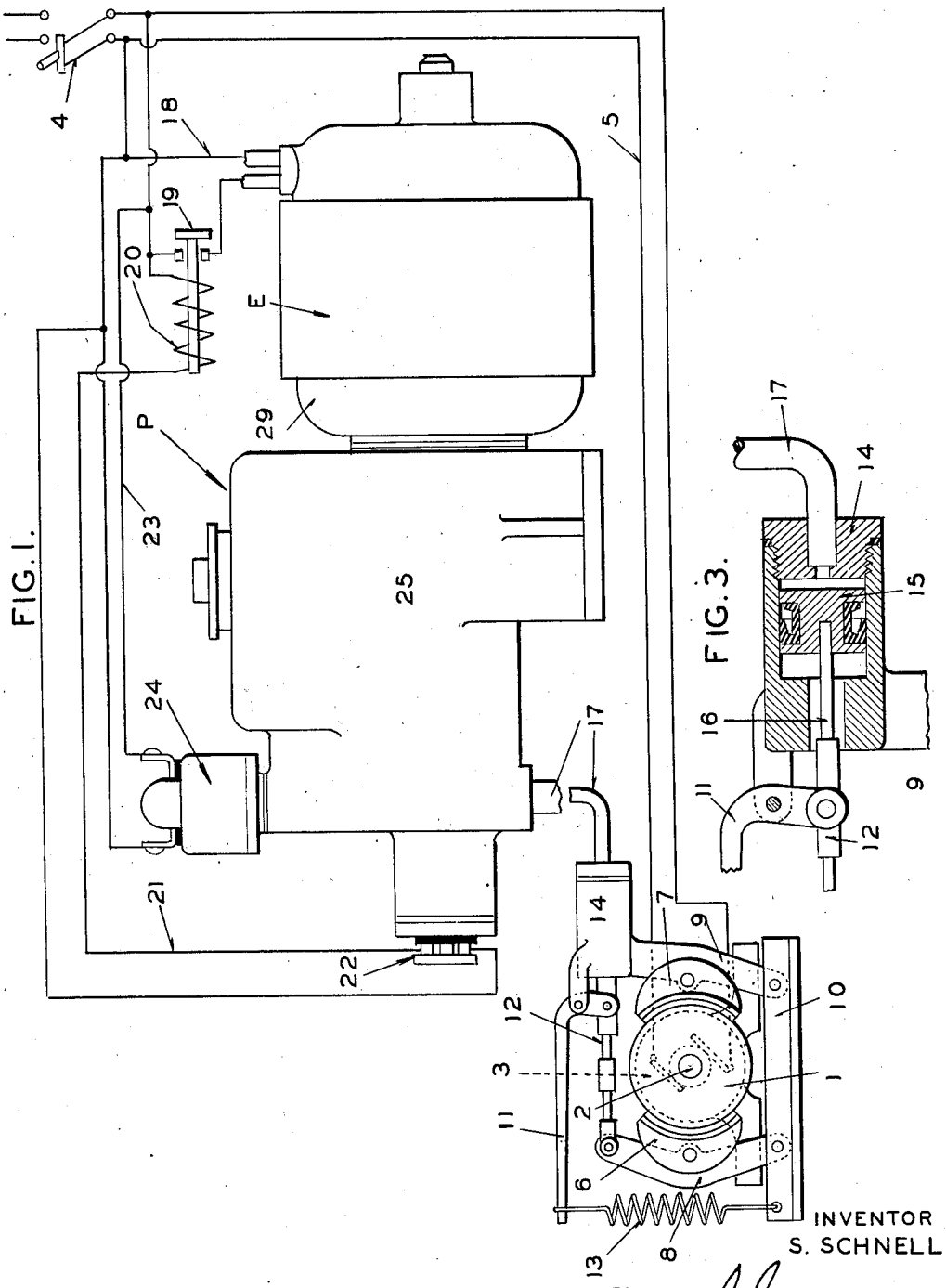

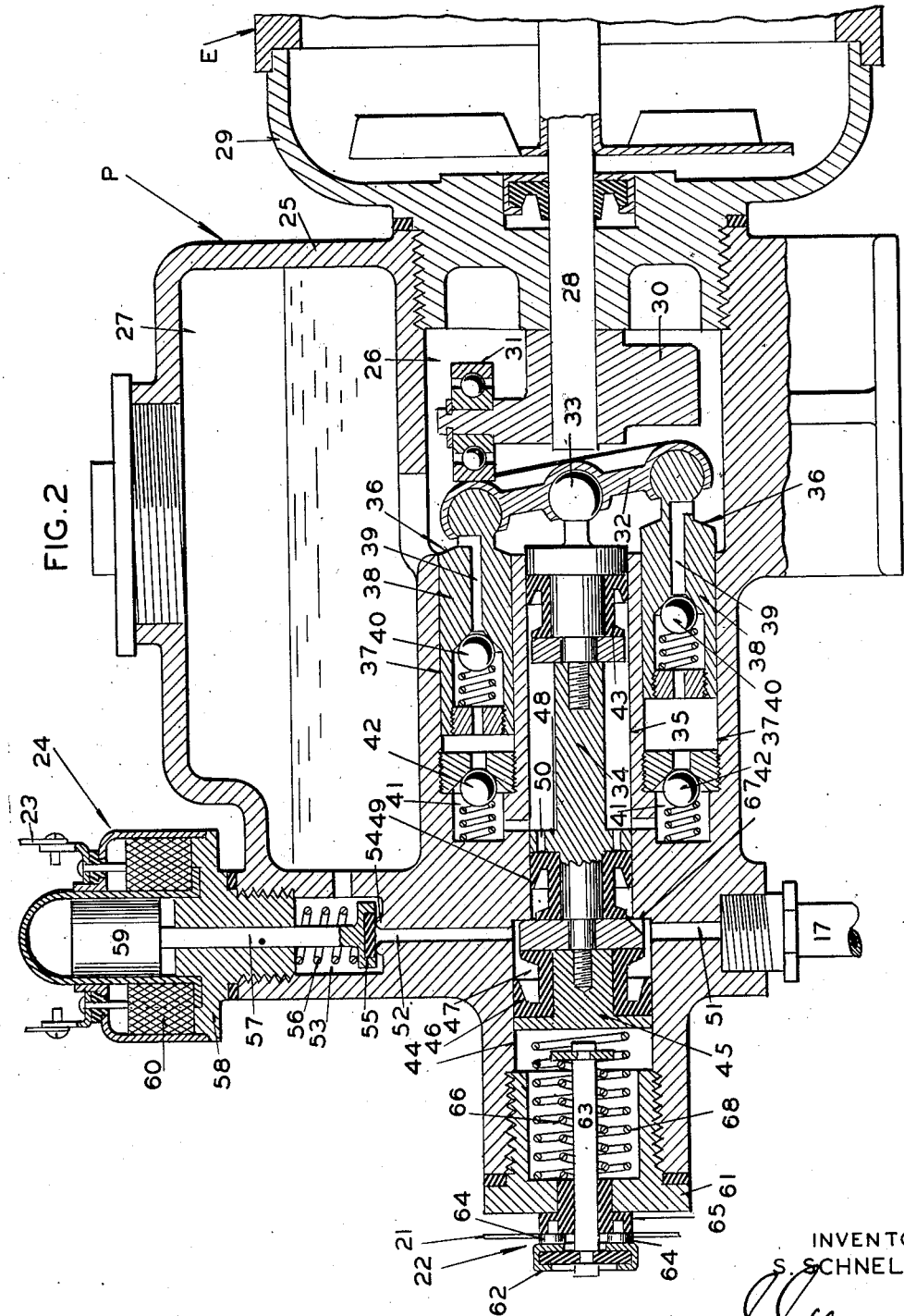

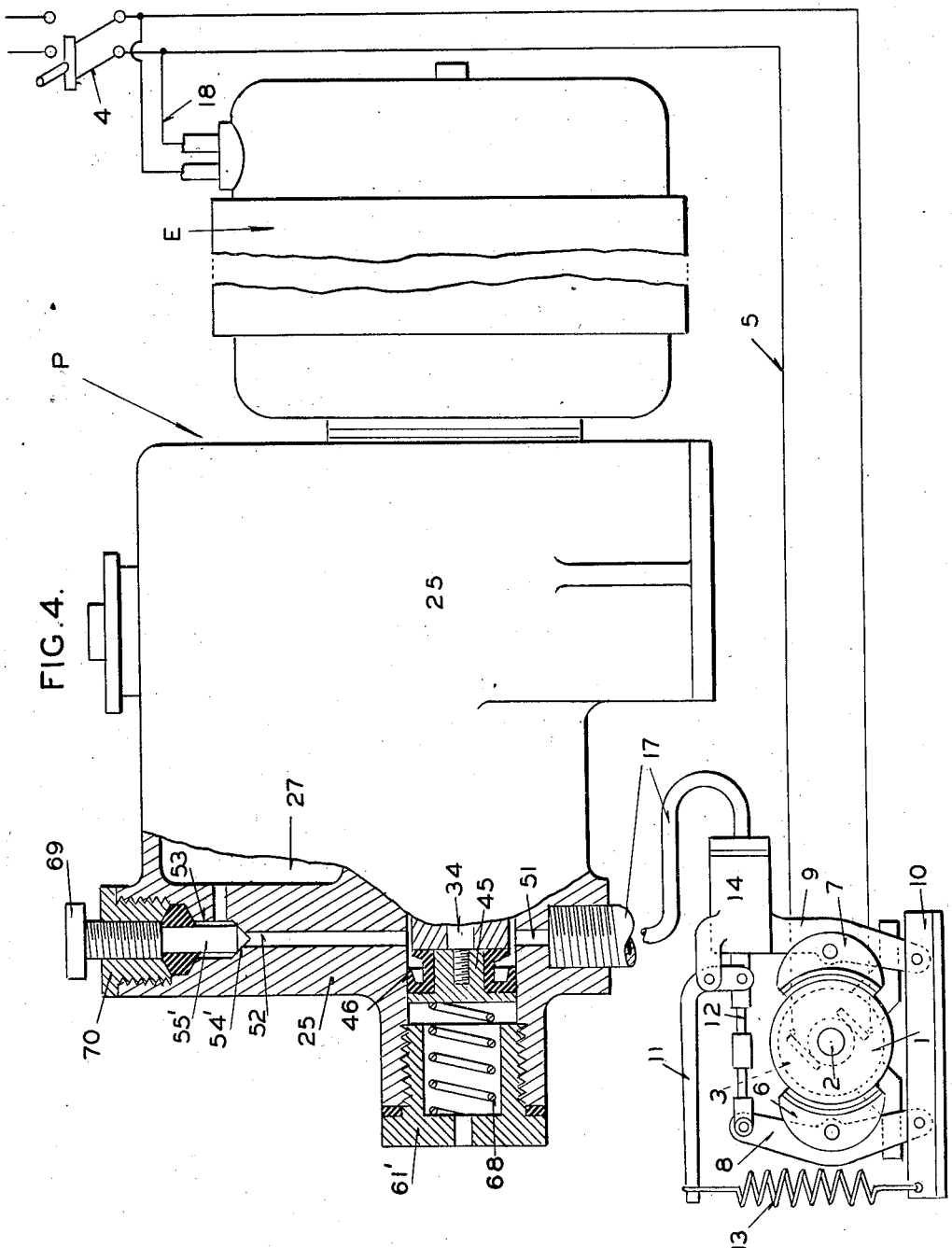

2,382,263

UNITED STATES PATENT OFFICE 2,382,263

BRAKING SYSTEM

Steve Schnell, Kirkwood, Mo., assignor to Wagner Electric Corporation, St. Louis, Mo., a corporation of Delaware Application February 20, 1943, Serial No. 476,520

3 Claims. (Cl. 188—170)

My invention relates to a brake controlling system and more particularly to one to be employed in controlling a spring-applied brake used, for example, on industrial equipment.

One of the objects of my invention is to provide an improved fluid pressure operated brake controlling system which will permit quick release and application of a brake.

Another object of my invention is to produce a brake controlling system for a spring-applied brake which will be so associated with the controlling means for a device or mechanism upon which it operates that said brake controlling means will automatically permit release of the brake when the device being braked is caused to be operated by its controlling means.

A further object of my invention is to produce an improved brake controlling means employing fluid pressure developed by electrical power means which can be readily associated with and controlled by an electrical control means for a mechanism having a brake to be controlled by said brake controlling means.

Still another object of my invention is to provide a brake controlling means for a spring-applied brake.

Other objects of my invention will become apparent from the following description taken in connection with the accompanying drawings in which Figure 1 is a schematic view of a brake controlling system embodying my invention; Figure 2 is an enlarged sectional view of the pump and associated parts; Figure 3 is a sectional view of the fluid motor for the brake; and Figure 4 is a schematic view, partly in section, showing a modified control system.

Referring to the drawings and first to Figure 1, there is disclosed a brake drum 1 which is mounted on the end of a rotor shaft 2 of an electric motor 3, which motor is employed in driving any desired apparatus as, for example, a crane, a winch, and so forth. The electric motor is controlled by a switch 4 in the electric circuit 5 thereof. By this arrangement whenever the motor is driven to operate the mechanism to which it is connected, drum 1 will also be rotated. The drum 1 is employed for braking the motor and mechanism driven thereby and associated with the drum are brake shoes 6 and 7 mounted on levers 8 and 9, the lower ends of which are pivoted on a base plate 10. The upper end of lever 9 has an L-shaped lever pivotally connected intermediate its ends. The short arm of this lever is connected by a link 12 with the upper end of the other lever 8. The long arm of the lever has associated therewith a strong spring 13 which so operates on the lever to normally hold the brake shoes applied with the drum.

The releasing means for the brake comprises a cylinder 14 mounted on the upper end of lever 9 and having reciprocable therein a piston 15 connected by a rod 16 with link 12. Fluid under pressure is admitted to the cylinder to operate the piston by means of a conduit 17 connected to the outlet of a pump "P." Thus it is seen that when sufficient fluid pressure is developed by this pump "P" the piston and cylinder will be caused to be moved relatively to each other and thereby separate levers 8 and 9 and release the brake shoes from the drum against the action of the strong spring 13.

The pump P is driven by an electric motor E, circuit 18 therefor being connected to be controlled by switch 4 of circuit 5 for the motor 3. In the circuit 18 is a switch 19 controlled by a solenoid 20. The solenoid is connected in a circuit 21 parallel with circuit 18 for the motor "E" and in said circuit 21 is a switch 22 which is controlled by fluid pressure developed by the pump as will become apparent later when the details thereof are described. Also, parallel with circuit 18 for the motor E is another circuit 23 in which is a solenoid 24, the purpose of which will also become apparent later.

The pump P is of the swash plate type and shown in detail in Figure 2. The pump may be of other types if desired. The pump shown is embodied in a casing 25 having intercommunicating reservoir compartments 26 and 27. A driving shaft 28 for the pump extends into compartment 26 and is connected directly to the rotor of motor E, said motor having its end plate 29 screwed into casing 25 for mounting purposes. On the inner end of the driving shaft is a pump driving member 30 carrying a roller 31 mounted on an axis at right angles to shaft 28.

The roller 31 actuates a swash plate 32 which is mounted at its center, by means of ball and socket joint 33, to a reciprocable member 34 positioned in a cylinder 35 of the main casing 25. This swash plate actuates a plurality of pumping units 36 which are mounted in surrounding relation to cylinder 35. The pumping units may be any number desired, two only being shown in the sectional view. Each of the pumping units is identical and comprises a cylinder 37 within which is reciprocable a piston 38 connected to the outer portion of the swash plate by a ball and socket joint. An inlet passage 39 is provided in the piston which is controlled by an inlet check valve 40. An outlet passage 41 from cylinder 37 connects the cylinder with the central cylinder 35. A check valve 42 controls this outlet passage.

From the foregoing it is seen that when the driving shaft 28 is rotated, the swash plate 32 will be wobbled and thereby operate the pumping units 36 in a well-known manner. When a piston 38 is forced inwardly, the fluid in the cylinder ahead of the piston will be forced out of cylinder 35 and when the piston is withdrawn, a new charge of fluid can enter the cylinder ahead of the piston from compartment 26 by way of passage 39 and check valve 40. In order that fluid under pressure which has been placed in cylinder 35 cannot leak back into chamber 26, the reciprocable member 34 carries a packing element 43.

In axial alignment with cylinder 35 is a larger cylinder 44 in which is mounted a piston 45 carrying a sealing member 46 and connected to the reciprocable member 34. Piston 45 and cylinder 44 form a chamber 47 which can receive the fluid pressure developed by the pumping units. In order to prevent fluid which has entered chamber 47 from returning to cylinder 35, the reciprocable member 34 is provided with check valve means in the form of a flange 48 and packing cup 49. Passages 50 in the flange will permit fluid to flow therepast and then slip past the lip of the packing cup in a well-known manner. Thus it is seen that any fluid under pressure which enters chamber 47 cannot flow back into cylinder 35 and the pumping units in the event the pumping units are not operating.

Chamber 47 is provided with an outlet passage 51 which is connected to the previously mentioned brake operating cylinder 14 by means of the conduit 17. Thus when fluid pressure is developed in chamber 47, it will also be effective in cylinder 14 and if the pressure is sufficient, the brake shoes will be caused to be released from the drum.

Chamber 47 is also provided with an outlet passage 52 which is connected to a chamber 53 having communication with the upper reservoir compartment 27. The passage 52 has a valve seat 54 associated therewith and cooperating therewith is a valve element 55 biased on the seat by a light spring 56. The valve element has a valve stem 57 which extends upwardly through a plug 58 for chamber 53 and secured on the outer end of this stem is an armature 59 of solenoid 24 previously referred to in connection with Figure 1. Surrounding this armature is the coil 60 of the solenoid which is connected in circuit 23. The solenoid, when energized, will hold valve element 55 on its seat by sufficient force that it cannot be unseated except by a large fluid pressure in chamber 47. In the particular construction shown the solenoid is intended to hold the valve seated under approximately nine hundred pounds of fluid pressure. The weak spring 56 on the other hand is only capable of holding the valve seated when the pressure in chamber 47 is about ten or twelve pounds.

The previously mentioned switch 22 is carried by a closure plug 61 for the outer end of cylinder 44. The movable contact element 62 of the switch is carried on a stem 63 which extends into cylinder 44 to a point adjacent piston 45. The fixed terminals 64 of the switch are mounted upon an insulating member 65 which also acts as a bearing and insulation for stem 63. The switch is normally maintained closed by a light spring 66 which is interposed between the plug and the inner end of stem 63. The switch is open only when piston 45 and the reciprocable member 34 are moved to the left.

The longitudinally movable member 34 and piston 45 are biased to the left position where piston 45 abuts shoulder 67 at the juncture of cylinders 35 and 44 by a spring 68. In this position the swash plate will be so tilted that the maximum stroke of the pistons of the pumping units will be available.

When the mechanism with which the brake and control means are employed is inoperative, the parts will be in the positions shown. Under these conditions the brakes will be held applied by the action of spring 13 and switch 4 will be open. Pump P will be inoperative and none of the circuits will be energized including the circuit for motor E which drives the pump. Only a very slight fluid pressure will be present in cylinder 14 and chamber 47 which pressure would be determined by the spring 56 holding the valve element 55 lightly seated.

If it should be desired to start the mechanism to be driven by motor 3 and with which the brake is associated, switch 4 is closed. This will energize the motor 3 and since switch 22 is closed, solenoid 20 will also be energized, thereby closing switch 19 of circuit 18 and causing motor E for the pump to be driven. Also, circuit 23 including solenoid 24 will be energized, thereby causing valve element 55 to be held tightly seated with a predetermined force. When the pump is operated by the operation of motor E, the pistons of the pumping units will be reciprocated, thereby forcing fluid under pressure into cylinder 35 and then past piston 48 and cup 49 to chamber 47 and cylinder 14. Due to the incompressibility of the fluid, the fluid pressure built up substantially immediately reaches such a value that relative movement takes place between cylinder 14 and piston 15 associated with the brake. This releases the brake shoes and permits motor 3 to rotate and operate the mechanism connected therewith. Thus motor E and motor 3 begin rotation substantially simultaneously.

Due to the arrangement of the reciprocating member 34 and the piston 45 as shown, the fluid pressure developed in cylinder 35 and chamber 47 will produce a force tending to move the reciprocable member to the left. Movement of this member, however, is prevented by spring 68 until the force reaches a value sufficient to overcome the action of the spring. The fluid pressure developed to produce this force is greater than that necessary to release the brake shoes against the action of spring 13. When member 34 moves to the left it will carry with it the pivot of swash plate 32, thereby shortening the strokes of the pistons of the pumping units. As member 34 moves to the left, stem 63 will be picked up and switch 22 will be opened. The opening of this switch will cause circuit 21 to be de-energized, which in turn will open switch 19, thereby breaking the circuit for motor E. Pumping action will be very small at the time of opening switch 19 and the stopping of motor E. The opening of circuit 18 will not open circuit 23 and thus solenoid 24 will remain energized. Thus the fluid pressure developed by the pump will be maintained in chamber 47 and also in cylinder 14, thereby maintaining the brake released. If there should be any loss of pressure in chamber 47 and cylinder 14 due to leakage, then piston 45 will move back to the right due to the decrease in fluid pressure and the action of spring 68. This will re-close switch 22 and cause motor E to again operate to replace the lost pressure.

If it is desired to stop the mechanism which is driven by motor 3, switch 4 is opened. The opening of this switch will immediately result in motor 3, together with solenoid 24, becoming de-energized. Since valve element 55 will now no longer be held seated by any force except the light spring 56, the fluid in chamber 47 and cylinder 14 will be immediately released into the upper reservoir compartment, thereby permitting spring 13 of the brake to again apply the brake shoes.

From the foregoing it is seen that the operation of the brake is controlled by the same control means which is employed in controlling the operation of the driving motor 3 of the mechanism with which the brake is associated. The brake shoes are released after motor 3 has been energized. Thus the mechanism driven by motor 3 will be moved immediately upon release of the brakes. The application of the brakes will occur as soon as the circuit for motor 3 is broken since the solenoid will be de-energized and the fluid pressure holding the brakes released is immediately dissipated to the reservoir. Thus it is seen that the braking system is entirely automatically operable by the operation of the control means for whatever mechanism the brake is associated with. It is not necessary for the operator to employ any extra care in applying and releasing the brakes as all he need do is to control the mechanism with which the brake is associated and in the usual manner.

There may be certain conditions when it is desired to have the brake slowly applied and relatively quickly released. The system may be readily adapted to this type of brake control as will be apparent from the modification shown in Figure 4. In this modification switch 22, solenoid 24, and the relay-operated switch 19 are removed from the system. In place of the valve element 55 and its seat 54, there is a seat 54' and a cone-shaped valve element 55' associated with conduit 52. The valve element is on the end of a screw 69 which is threaded through a packing gland 70. The plug 61' replaces plug 61 which formerly carried the parts of switch 22. The spring 68 is interposed between plug 61' and piston 45. All the other parts of the system remain as previously described in connection with Figures 1 to 3 and are designated by the same reference characters.

In the modification when switch 4 is closed, the motor E for the pump will be energized and rotation of its rotor will cause pumping to take place. Motor 3 will also be energized. Fluid under pressure will be immediately developed in chamber 47 and cylinder 14 associated with the brake. Fluid under pressure is permitted to flow past the valve seat 54' and valve element 55' but the relationship of this seat and valve element will be such that the pump can build up a pressure when the pistons of the pumping units have maximum stroke. When sufficient pressure is built up, the longitudinally reciprocable member 34 will be moved to the left. This will decrease the volume of fluid pumped by the pumping unit and a point will be reached where the fluid pumped will just be sufficient to compensate for the leakage at valve element 55'. The pressure built up will be quite rapid and it will be great enough before any movement of member 34 as to cause release of the brakes against the bias of the applying spring 13. As long as switch 4 is closed, motor E will continue to operate and the amount of pressure maintained in chamber 47 will hold the brakes released.

When switch 4 is opened both motors will be de-energized and consequently pumping will cease. However, the brakes will not be immediately applied due to the fact that the fluid pressure in chamber 47 and cylinder 14 will not be immediately released. As the pressure slowly drops by leakage of fluid past valve element 55', the spring will gradually apply the brake shoes.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In apparatus of the class described, a rotatable driven member, a brake therefor, means comprising a fluid motor for controlling the brake, a pump having an outlet connected to the fluid motor, said pump being of the reciprocating piston type provided with a swash plate actuating means for operating the pump pistons and a driving member for said swash plate, a movable member for varying the relationship between the pivot of the swash plate and its driving member to thereby control the strokes of the pump pistons, means to vary said relationship as the pressure developed thereby approaches a predetermined value, an electrical motor for driving the driven member, a circuit for the motor including two switches, manual means for controlling one switch, means for moving the movable member by fluid pressure developed by the pump to thereby decrease the volume of fluid under pressure pumped by the pistons, and means for opening the other switch by the movable member when a predetermined pressure has been developed by the pump.

2. In a brake control, a motor, a member driven by said motor, a brake for said member, a hydraulic motor to control the application of said brake to said member, a variable displacement pump to supply liquid under pressure to said hydraulic motor, a motor to drive said pump, a control device which includes a differentially diametered cylinder having pistons provided with opposed packing seals forming a chamber between same supplied with liquid under pressure from said pump, the seal on the smaller piston acting as a one-way valve while said pump is operative, means connecting said pistons and said pump to decrease the output thereof as the pressure is built up in said chamber by said pump, and means controlled by the larger of said pistons to stop said motor after a predetermined pressure has been built up in said cylinder.

3. In an apparatus as defined in claim 2 which includes a valve associated with said chamber controlled by the power supply to said motors to relieve pressure in said cylinder and in said hydraulic motor upon failure of the power supply to said motors.

STEVE SCHNELL.